United States Patent [19]

Biglin

[11] 4,194,128
[45] Mar. 18, 1980

[54] RIPPLE CONTROL SYSTEMS

[75] Inventor: Timothy J. Biglin, Bath, England

[73] Assignee: The Horstmann Gear Company Limited, Avon, England

[21] Appl. No.: 819,225

[22] Filed: Jul. 26, 1977

[30] Foreign Application Priority Data

Jul. 27, 1976 [GB] United Kingdom ............... 31298/76

[51] Int. Cl.² .......................... H02J 13/00; H04B 3/56
[52] U.S. Cl. ........................................ 307/3; 307/7; 340/310 R; 307/27
[58] Field of Search ................................. 307/3, 1–8; 340/288, 310 R; 333/1, 5, 4, 12, 77, 76; 323/76; 179/2.5 A, 2.5 B, 2.5 R

[56] References Cited

U.S. PATENT DOCUMENTS 2,300,940  11/1942  Lenehan ...................... 340/310 R
4,017,845   4/1977  Kilian ......................... 340/310 R Primary Examiner—L. T. Hix
Assistant Examiner—S. D. Schreyer
Attorney, Agent, or Firm—Emory L. Groff, Jr.

[57] ABSTRACT

A three phase ripple control system for feeding a control signal onto each phase line employs an injection transformer having a primary winding and three secondary windings. A control signal generator is connected in circuit with the primary winding and serves to provide a signal thereto. A respective inductor is connected in series in each phase line and is connected in parallel with a respective one of the secondary windings. The inductors have a value of inductance arranged such that their impedance at line frequency is substantially smaller than the magnetizing impedance of the transformer. The secondary winding thereby introduce a common control signal onto each of the three phase lines.

6 Claims, 2 Drawing Figures

RIPPLE CONTROL SYSTEMS

BACKGROUND OF THE INVENTION

This invention relates to a three phase ripple control system, so called because a control signal, normally of audio frequency is injected onto the normal distribution conductors, usually those supplying power to the equipment to be controlled, in the form of a 'ripple' or modulation of the basic current flow.

Ripple control is already well known, but the majority of ripple control schemes in operation at present use shunt injection systems. The injection signal source is connected between line and neutral and thus has to supply power to both the load and the mains power source, resulting in a large injected signal power wastage in the mains source. A series injection system with the generator in each line avoids this power wastage, but in this case the injection signal source is connected in series with the mains supply and therefore has to carry the entire load current without adverse effect.

Another method of achieving series injection employs a transformer of single phase construction, with its secondary connected in series in the mains supply line. This therefore only presents its leakage impedance to balanced three phase load currents. The impedance presented to zero sequence depends on the impedance of the injection signal generator at supply frequency and will usually be large compared to the mains source impedance; this leads to a mains frequency voltage drop across the transformer due to zero sequence current and to undesirable mains frequency voltages and currents being induced into the injection signal generator.

SUMMARY OF THE INVENTION

Accordingly, the invention proposes a three phase ripple control system for feeding a control signal onto each phase line, the system comprising an injection transformer having a primary winding and three secondary windings a control signal generator connected in circuit with said primary winding and a respective inductor connected in series in each phase line which inductors are each coupled in parallel with a respective one of said secondary windings for receiving a common control signal.

Preferably, the inductor is also shunted by a capacitor to form a circuit resonant at a desired signal the inductors having a value of inductance arranged such that their impedance at line frequency is substantially smaller than the magnetising impedance of the transformer frequency.

BRIEF DESCRIPTION OF THE DRAWINGS

In order that the invention shall be clearly understood, two exemplary embodiments relating to three phase supply systems will now be described with reference to the accompanying drawings, in which.

DESCRIPTION OF THE PREFERRED EMBODIMENTS

Figure 1:
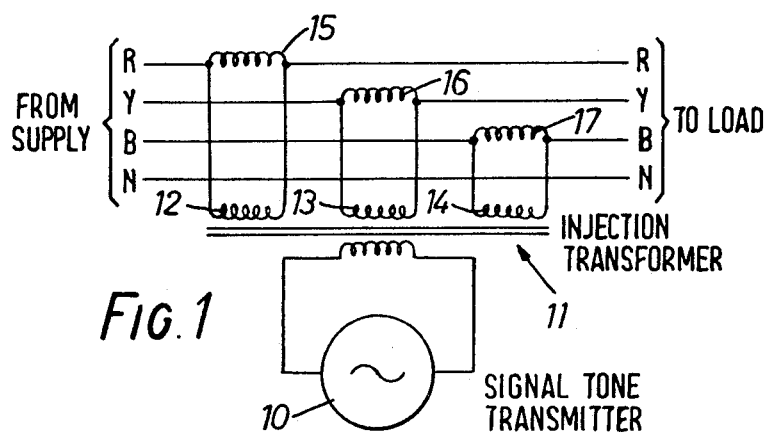
FIG. 1 is a circuit diagram of a first embodiment constructed in accordance with the invention.

In FIG. 1, a three phase supply system R, Y, B, N is connected at one side to the power supply and at the other side to a load, for example a street lighting system.

A signal tone transmitter 10 is connected to the primary of an injection transformer 11. The three secondary windings 12, 13, 14 of the latter are connected respectively to an inductor 15, 16, 17 connected in series in the lines R, Y, B of the supply system.

The transformer design is such that its magnetising impedance at mains frequency is very much higher than the impedance of the inductors 15, 16, 17 at mains frequency, and also such that its leakage impedance at mains frequency is very much less than the leakage impedance of the inductors at mains frequency. The size of each inductor is chosen such that, when carrying the maximum normal zero sequence load current expected, its voltage drop is within the maximum acceptable supply frequency voltage drop across the injection equipment. In operation, balanced three phase mains currents take the low impedance path through the injection transformer 11, whereas zero sequence currents see the injection transformer 11 as a high impedance and thus pass through the inductors 15, 16, 17.

Figure 2:
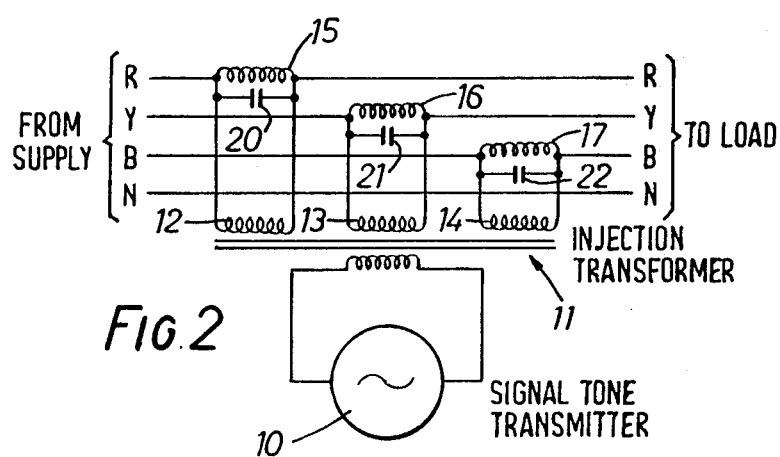
FIG. 2 is a circuit diagram of a second embodiment constructed in accordance with the invention employing a tuned circuit in series with the supply conductors.

FIG. 2 shows a preferred injection system, in which each inductor is shunted by a capacitor 20, 21, 22. Each inductor/capacitor is tuned to the signal frequency of the tone transmitter 10, and therefore represents, ideally, no extra load to the transmitter.

By a suitable choice of the component values of the tuned circuit it may be arranged to have a low impedance at supply frequency compared to the impedance presented by the injection transformer to unbalanced currents and thus provide an alternative path for them: balanced currents will continue to flow through the injection transformer windings which, due to its single phase construction, ideally presents no impedance to balanced currents.

Line injection is preferred to neutral injection because a failure of a neutral connected transmitter could, in some circumstances, cause excessive supply frequency voltages to appear across parts of the load.

If the supply source has a high impedance, either a series tuned circuit tuned to the signal frequency or a zero sequence filter, may be placed across it to shunt the high impedance. Since the injected signal appears in phase and balanced on all three phases of the supply it will not be effectively propagated through any three phase supply transformers and thus to adjacent controlled systems.

Although the embodiments described are three phase systems it will be appreciated that the invention is applicable to systems having a different number of phases and also to single phase systems.

It will be understood that the above description of the present invention is susceptible to various modification changes and adaptions.

What I claim is:

1. A three phase ripple control system for feeding a control signal onto each phase line, the system comprising an injection transformer having a primary winding and three secondary windings a control signal generator connected in circuit with said primary winding and a respective inductor connected in series in each phase line which inductors are each coupled in parallel with a respective one of said secondary windings for receiving a common control signal the inductors having a value of inductance arranged such that their impedance at line frequency is substantially smaller than the magnetising impedance of the transformer.

2. A ripple control system in accordance with claim 1 including in each phase line a capacitor connected in parallel with said inductor to form a circuit resonant at a desired signal frequency.

3. A ripple control system in accordance with claim 2, wherein said resonant circuit has an impedance at supply frequency that is low compared to the impedance of said injection transformer at the frequency of unbalanced currents.

4. A ripple control system in accordance with claim 1, wherein said transformer and said inductor each have a leakage impedance and the leakage impedance of said transformer is less than the leakage impedance of said inductor at supply frequency.

5. A ripple control system in accordance with claim 1, wherein the supply conductor is connected to a supply source and a series tuned circuit is connected in parallel arrangement with said supply source.

6. A ripple control system in accordance with claim 1, wherein the supply conductor is connected to a supply source and a zero sequence filter is connected in parallel arrangement with the supply source.

* * * * *